Patented Feb. 18, 1941

2,232,462

UNITED STATES PATENT OFFICE 2,232,462

METHOD OF MAKING CERAMIC PRODUCTS

Donald E. Lower, Lansdale, Pa.

No Drawing. Application February 21, 1938,
Serial No. 191,826

8 Claims. (Cl. 25—156)

The invention generally considered relates to a novel process for treating ceramic material.

The primary object of the invention is to provide a novel method of treating tiles, bricks, granules and other ceramic bodies, which includes the treatment of such bodies with an acid solution and thereafter subjecting the same to heat, which process serves to prevent warping or other distortion of the ceramic bodies.

Another object of the invention is to provide a novel method of making ceramic bodies to render the same substantially impervious to the action of acids and easier to fabricate.

Another object of the invention is to provide a novel method of making ceramic products by which the color characteristics of one or more of the ceramic ingredients thereof are intensified after the subsequent firing of the said bodies to give to the finished product such color, and whereby certain selected colors can also be produced in the finished product by either the use of selected ceramic material having inherent color characteristics, or by adding to the ceramic material certain inorganic coloring agents.

A further object of the invention is to provide a novel method of making ceramic products by which ceramic material containing substances formerly considered detrimental to the finished product may be used advantageously in the production of ceramic bodies without any harmful effect on the finished product.

A still further object of the invention is to provide a method of making ceramic products by which some or all of the above objects can be attained whether the ceramic body subjected to the method is vitrified, partially vitrified or unvitrified at the time it is subjected to the steps of the novel method.

Other and further objects will hereinafter appear in the disclosure of the invention and be particularly pointed out in the appended claims.

The invention comprises essentially the treatment of ceramic bodies with a solution of phosphoric acid and subsequent firing of the same. It can be applied to all ceramic bodies, but is particularly applicable to those containing silica in some form, usually as silicates of the different metals. The chemical reaction of these silicates with phosphoric acid transforms them into the corresponding phosphates and the presence of phosphates in the ceramic body is responsible for most of the desirable results obtained by the acid treatment.

The acid treatment can be accomplished in various ways, the only essential being that the ceramic body be effectively exposed to the action of the acid. Of the numerous ways in which this can be accomplished, typical ones are:—spraying the body with an acid solution, immersing or dipping it into an acid bath, and using a glazing machine. Of these methods, the one preferred and considered of widest application in the manufacture of tiles and the like is the use of an acid spray. With a spray the extent of the treatment can be easily controlled and the acid solution can be readily applied to less than all the surfaces of the tile, which is often very desirable.

One of the major difficulties encountered by the ceramic industry in vitrification has been the warping and keystoning of the ceramic bodies during the firing by which the vitrification is obtained and the resultant inability to manufacture bodies of uniform size and shape. The warping is principally due to the flowing of complex silicates contained in the ceramic material on the application of sufficient heat to accomplish vitrification. As heretofore stated, the phosphoric acid reacts with part of the silicates to form phosphates. Phosphates, generally, vitrify at a lower temperature than do silicates and by judicious control of the heat during firing, complete vitrification of the treated ceramic body can be obtained before the complex silicates have reached a temperature at which they flow freely. Consequently, warping and keystoning of preformed ceramic bodies is prevented by the acid treatment.

The advance of the present process over the art in preventing warping and keystoning is not so apparent when the ceramic body is prepared by grinding and pugging as substantially the same effect may be produced by mixing the acid directly with the ceramic material during pugging. However, the present process is equally effective as applied to all silica containing ceramic bodies whether the ceramic material, of which they are formed, is pugged, dry-presed, molded or used in its original rock form before the acid treatment. This is particularly important if the ceramic bodies are formed by molding. In order to mold ceramic material, it is necessary to pour the material in liquid or slip form into the mold. Phosphoric acid is a flocculating agent and if added to the material before pouring, the material becomes too viscous to be poured. By subjecting the ceramic body to the acid treatment after it has been poured and formed, as in the present process, the difficulties encountered due to the viscosity of the material are avoided, while at the same time warping and keystoning on firing is prevented. A typical mixture of ceramic material which can be used in the molding process and has proved very effective when subjected to the acid treatment and subsequently fired is—

| | |
|---|---|
| Clay | 250 |
| Spar | 450 |
| Talc | 300 |
| Granules of stone, grog or slag | 200 |

Water sufficient to form a slip with the aid of a deflocculent.

Veary beautiful color effects are produced in certain ceramic bodies by the acid treatment. One characteristic of phosphoric acid treated bodies is that the natural color of the ceramic material which is usually lost on firing, is clearly brought out when acid treated bodies are fired. If the ceramic materials are normally colorless or if the colors are not of sufficient variety to produce the different color effects often desired in tiles and the like, the desired colors can be obtained in one of two ways, either by the selection of ceramic materials having inherent coloring matter, or by mixing with the material certain inorganic coloring agents. In either case the acid treatment prevents the loss of the desired colors and produces a great variety of color effects. The different types of inorganic coloring agents which can be used and the effect of phosphoric acid on each, are set out at length in my patent on a Method of making vitrified products, No. 2,138,870.

The broad scope of the present process is most apparent when another aspect of it is considered. Phosphoric acid not only reacts chemically with silicates in their normal state, but will also react with them after they have been fused in the process of vitrification. The latter reaction occurs when the acid and silicates are subjected to heat at a temperature above 752 degrees F., and as the temperature at which ceramic bodies normally vitrify is much higher, the reaction will always take place on the subsequent refiring of ceramic bodies after the acid treatment. This property enables the present process to be used with completely vitrified or unvitrified ceramic bodies, as well as with bodies which have undergone any degree of partial vitrification. Thus a ceramic body can be fired, the firing interrupted before complete vitrification and the attendant flowing of the complex silicates has taken place, and the body then treated with a phosphoric acid solution. On subsequent refiring, complete vitrification can be obtained without the objectionable warping and keystoning which ordinarily follow. If, on the other hand, it is desired to produce certain coloring effects in a previously vitrified ceramic body or to produce any of the other results obtained by the acid treatment, the vitrified body can be treated with phosphoric acid and then refired at a temperature below that of vitrification of an untreated body, whereby the desired result is obtained without harmful effect to the ceramic body.

The activity of phosphoric acid with the silicates in ceramic material also produces another very important result. Silicates will react chemically with both phosphoric and hydrofluoric acids. If, however, the ceramic material is first treated with phosphoric acid, the resultant phosphates will not react with any acid, even hydrofluoric. As such phosphates are formed by the present process, bricks or tiles can be produced which are impervious to the action of all acids and of wide application, particularly in the chemical industry.

As explained above, phosphates vitrify at a lower temperature than do silicates. Accordingly, if a ceramic body of which the surface only has been converted into phosphates by the acid treatment is fired at a lower temperature than that required to vitrify an untreated body, a glaze of vitrified material is formed on the surface while the rest of the body remains unvitrified. The depth of the glaze will vary according to the penetration of the acid into the ceramic body and can be increased by controlling the penetration from a mere surface glaze to a completely vitrified ceramic body. The penetration of the acid is dependent upon two factors, the length of time of the acid treatment, and the concentration of the acid, of which the first is the more important. By varying these two factors and controlling the temperature at which the ceramic body is fired, vitrification to the depth desired for the particular application of the ceramic body can be obtained. Various concentrations of phosphoric acid in the acid solution can of course be used. However, as the cheap by-product acid of about 50% concentration has proved adequate for obtaining the many possible results of the acid treatment, it particularly lends itself to the commercial practicability of the present process.

One further feature of the phosphoric acid treatment should not be neglected. Ceramic materials containing impurities such as magnesium, calcium, and zinc were formerly considered unsuitable for use in the manufacture of vitrified products as they greatly decreased the quality of the final product. The acid treatment enables the use of materials containing such impurities without any deleterious effect on the finished product. Consequently, such materials, formerly considered unsuitable, can now be used in manufacturing ceramic bodies by whatever method, in conjunction with the process of the present invention.

From the foregoing disclosure, it will be seen that the treatment of ceramic bodies with a solution of phosphoric acid and the subsequent firing of the bodies, with which the present invention is concerned, is of wide application to ceramic bodies but particularly suited to those containing silica, however they may have been prepared.

Having now fully disclosed the invention, I claim:

1. In a method of making ceramic bodies, the steps which consist in treating the surface of a preformed ceramic body solely with a solution consisting of water and phosphoric acid and then firing said body.

2. In a method of making ceramic bodies, the steps which consist in treating the surface of a preformed ceramic body containing ceramic material having selected inherent color characteristics, solely with a solution consisting of water and phosphoric acid, and then firing said body.

3. In a method of making ceramic bodies, the steps which consist in treating the surface of a preformed ceramic body containing an inorganic coloring agent solely with a solution consisting of water and phosphoric acid, and then firing said body.

4. The method of making a ceramic product consisting in forming a ceramic body from selected ceramic materials, treating the surface of said body solely with a solution consisting of water and phosphoric acid, and then firing said body.

5. The method of making a ceramic product consisting in forming a ceramic body of selected vitrifiable ceramic materials, firing the body to produce partial vitrification, treating the surface of said partially vitrified body solely with a solution consisting of water and phosphoric acid, and subsequently refiring said body.

6. The method of making a ceramic product consisting in forming a ceramic body of selected vitrifiable ceramic materials, firing the body to produce complete vitrification, treating the surface of said vitrified body solely with a solution consisting of water and phosphoric acid, and subsequently refiring said body.

7. In a method of making ceramic bodies, the steps which consist in treating the surface of a preformed ceramic body solely with a solution consisting of water and phosphoric acid until the desired depth of penetration of the body by the acid is obtained, and subsequently firing said body at a lower temperature than that normally required to vitrify the untreated portion of the body in order to obtain a glaze of vitrified material on the surface of the body.

8. The method of making ceramic bodies, which consists in making a slip of a mixture of selected vitrifiable materials and water, forming the slip into a body of the desired shape in a mold, removing the formed ceramic body from the mold, treating the surface of said body solely with a solution consisting of water and phosphoric acid, drying the body and then firing the same.

DONALD E. LOWER.